May 25, 1965　　　　　J. P. SHEEHAN　　　　　3,185,759
TUBULAR ELECTRICAL CONDENSERS WITH OVERLAP SEAM LAMINATED CASING
Filed June 22, 1961
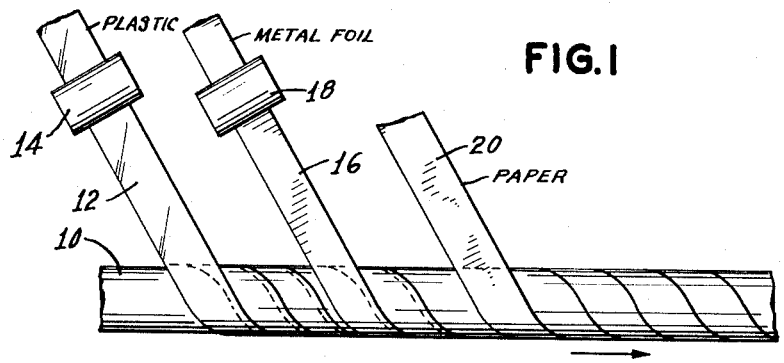
FIG. 1
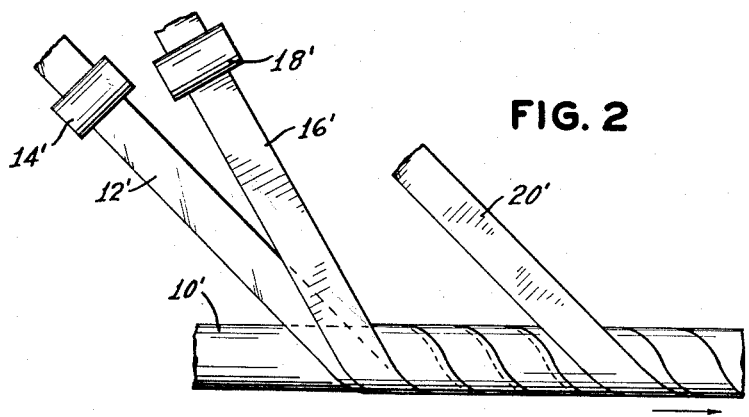
FIG. 2
FIG. 3
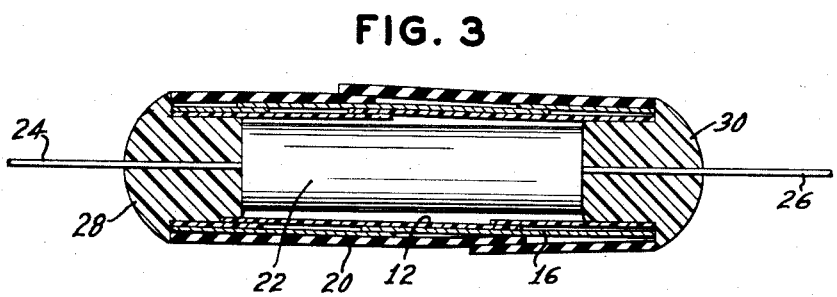
INVENTOR.
JOSEPH P SHEEHAN
BY
ATTORNEY United States Patent Office 3,185,759
Patented May 25, 1965

3,185,759
TUBULAR ELECTRICAL CONDENSERS WITH OVERLAP SEAM LAMINATED CASING
Joseph P. Sheehan, Forest Hills, West Sanford, N.C., assignor to Cornell-Dubilier Electric Corporation, a corporation of Delaware
Filed June 22, 1961, Ser. No. 118,855
6 Claims. (Cl. 174—52)

The present invention relates to electrical condensers, and to methods of making such condensers; and in particular it relates to improvements in the enclosing container for condensers and similar devices and its method of manufacture.

A common form of electrical condenser includes a wound body of electrodes and dielectric layers, and has a pair of oppositely projecting wire terminals. The body ordinarily has an impregnation of liquid or solid material, and it is enclosed in a tube, commonly of impregnated paper or a ceramic, and the ends are filled with some form of wax or resin end-fill material. The tube provides mechanical protection and contributes to the appearance of the unit. It also is intended to provide vital protection against penetration of moisture. The life of a condenser is extended considerably by the effectiveness of its enclosure in sealing out moisture.

An object of the present invention resides in a new and improved condenser having a highly effective moisture-excluding container, and to the method of making such condensers, more particularly the tubular enclosing portion thereof. The invention has analogous application to coils, to circuit sub-assemblies and similar devices involving like considerations of providing a protective insulating enclosure that is highly effective for excluding moisture and at the same time for providing insulation and mechanical protection. More specific features of the invention reside in the provision of a novel tubular case for an electrical component that incorporates an electrical shield, and in methods of making such tubular case.

The invention in its various aspects is disclosed in detail below in connection with an illustrative embodiment that is shown in the accompanying drawings. This embodiment involves a condenser body with oppositely projecting terminal wires contained in a tube and sealed by plastic end-fill resin. A film of moisture-impermeable plastic in the form of a tube forms the innermost layer of the tube. This layer has a surface that is treated to form an intimate bond to curable plastics, such as are used in the later impregnation of the tube and as the end-fill material. A layer of metal foil covers the plastic film and serves both as a shield and as a further moisture barrier that is insulated from the enclosed condenser body. A wrapping of paper is provided about the metal foil, the composite tube then being impregnated with a rigidizing plastic and cured. Unit lengths of the tube receive condenser bodies, and end-fill material covers the ends of the condenser bodies and complements the tube in excluding moisture. The end-fill material bonds to the plastic-film layer of the plastic impregnated tube.

The resulting unit is effectively protected against atmospheric humidity, and it is tough in resisting mechanical shocks. The tube is inexpensive readily fabricated as needed in various sizes, and can be assembled about the functional unit to be protected without subjecting that unit to excessive processing temperatures such as might be harmful to the electrical characteristics of the product.

The nature of the invention, and its further novel features, objects and advantages will be apparent from the following detailed description of the illustrative embodiment shown in the accompanying drawings, wherein:

FIGS. 1 and 2 are diagrammatic illustrations of alternative fabricating procedures in the novel manufacture of tubing utilized in the illustrative embodiment; and FIG. 3 is a diagrammatic longitudinal cross-section of a novel illustrative condenser, the component parts of the enclosure being exaggerated for more clearly showing the internal construction.

In FIG. 1, one form of tube-winding operation is diagrammatically represented. Mandrel 10 forms part of a well-known apparatus for making tubes continuously, such as drinking straws. A plastic strip 12 is drawn from a continuous supply of film of suitable width, under roller 14 that represents one part of an adhesive coating apparatus. A strip of metal foil 16 is similarly drawn from a continuous supply under adhesive coating roller 18. A strip of kraft paper, suitably colored, is drawn from a continuous supply. These three strips are wound in spiral form on mandrel 10, each turn of strip 12 overlapping the previous turn and each turn of strip 16 overlapping the previous turn. Strips 12 and 16 are of the same width, or nearly so, and the overlap seams of the strips 12 and 16 are staggered so that a continuous surface of metal foil extends across the edge of strip 12, and vice versa. Paper strip 20 is similarly helically-wound about the metal-foil layer, with any desired overlap of each paper layer and the next, or no overlap particularly where plural paper layers are used, as is desirable.

FIG. 2 represents a modification of FIG. 1. Primed numbers are used in FIG. 2 to designate parts corresponding to those in FIG. 1. In FIG. 2, strips 12' and 16' are laminated to each other, and are wound together, the outer surface of the two layers being adhesive-coated so as to provide adherence between the overlap regions and adherence for the subsequently wound paper 20'. It is contemplated that a laminated supply of plastic film and metal foil may be prepared, and handled in the winding operation as if the laminated strips were a single strip. In that case, the coating operation performed by roller 14' would become part of the preliminary laminating operation.

FIG. 3 represents an enlarged longitudinal cross-section of a tubular condenser, including a conventional wound body 22 made of layers of dielectric strips wound with metal-foil electrodes (or bearing metallized-film electrodes) that are separated from each other by the wound dielectric. A terminal wire 24 extends from one such electrode and another terminal wire 26 extends from the other electrode, and these are required to be protected from each other by insulation.

Helically-wound layers of plastic film 12, metal foil 16 and paper strip 20 are shown in exaggerated proportions in FIG. 3. Normally a single unit will have several helical convolutions from end to end; and both the plastic film and the metal foil are so extremely thin in practice as not to show without exaggeration. The proportions of paper layer 20 are also exaggerated, and only one layer is shown although multiple layers, with or without overlap, are used.

The composite tube 12, 16, 20 in FIG. 3 is not merely a short piece of tubing taken from the operation in FIG. 1. The wound tubing is cut to yard-long pieces that are impregnated with a rigidizing curable plastic, which is then heated to effect polymerization. The metal foil (annealed aluminum foil, for example) and the plastic film are sufficiently supple in the winding operation so as to be mutually conforming, even in the overlap seam areas; but any interstices between these layers that can be reached by the impregnating material, and the spaces in and associated with the paper are also filled with rigidized plastic; and the impregnating material also coats the inside surface of the tube.

The ends of body 22 and parts of terminal wires 24 and 26 are covered by end-fill material 28, 30, and this end-fill material is bonded to the inside surface of the tube.

A number of commercially available moisture-impervious films are suitable for use as film 12. For example polyvinyl fluoride film sold by Du Pont under the trademark "Tedlar" has been used with outstanding success. Fluorohalocarbon film sold by Allied Chemical Company under the trademark "Aclar" is also excellent. Other effective films are polyethylene terephthalate film sold by Du Pont as "Mylar"; polypropylene film as "Olefane" sold by American Viscose; and polyethylene sold as "Alathon" by Du Pont. These films are all characteristically very thin, commonly a fraction of .001 inch thick, and they are of unfilled plastic. Fillers generally tend to form moisture-penetrating fissures through the film and surface creepage paths, which would reduce their effectiveness in excluding moisture.

Each of the films as used is also surface-treated, so as to have surface acceptance for bonding to plastics. For surface-treating polyethylene terephthalate, polypropylene and polyethylene films, the following treatment is illustrative: The film is passed through a liquid mixture of twenty parts by weight of toluene 2,4-di-isocyanate and eighty parts by weight of orthodichlorobenzene, at 185° F. The vapor phase of toluene 2,4-di-isocyanate at 250° F. can be used where the softening point of the plastic will allow, e.g., "Mylar" and "Olefane." Surface treatment of plastic films is practiced widely and surface-treated films are commercially available; and such treatments are described in patents and the literature, no further discussion appears necessary here.

The adhesive coating used may be any of a variety of materials, such as rubber-based adhesives, epoxy-base adhesives, silicones, and polyesters. These all should adhere to both the surface-treated plastic films and to metal foil, as well as paper. They are thermosetting although they may actually have low cure temperatures, and they are essentially moisture impervious.

A suitable impregnant is an all hydrocarbon copolymer of butadiene and styrene containing side vinyl groups as reactive sites for subsequent cross-linking with vinyl monomers to form a thermoset resin. The material is impregnated into the yard-long tubes, which is then heated to effect setting and hardening, and the hard lengths of tube are cut into short pieces as required by the condenser to be encased. Any number of epoxy-based and other impregnants can also be used, excluding only those that are subject to moisture absorption.

Numerous suitable thermosetting end-seal formulations may be used at end seals 28 and 30. Epoxy resin with various fillers and a desired amount of hardener have been used successfully. Normally the filler in this composition should be such as not to impair the insulating properties of the end-fill, since the end fill may extend across the cut edges at each end of the tube where the metal foil is exposed. However, it is of advantage in some applications to use a filler in the formulation for the end fill at only *one* end of the condenser such that the end fill is relatively conductive and thereby connects the terminal wire at that end to the shield represented by the metal foil in the encasing tube. For example, powdered lead or lead oxide may be used in a conductive epoxy end-seal filler, and in that event the metal foil is advantageously of lead.

The tube-encased condenser above has numerous attributes and unique combinations of advantages. The moisture resistance far exceeds that of similar impregnated-paper encased condensers, and remarkably compares favorably with ceramic-tube condensers in this respect. Unlike ceramic tubes, the present tubular condensers are not subject to cracking and they can be attractively colored and labeled in a way that far surpasses the limitations of ceramic tubulars. The novel condenser incorporates a shield, and yet does not have any appreciable hazard of accidental short-circuiting such as might be caused by an exposed-metal shield. Even were the end-seal material limited so as to expose the foil edges at the ends of the unit, there is only remote possibility of the foil causing a short-circuit.

It is apparent that the novel features of the foregoing disclosure are readily susceptible of varied application and modification by those skilled in the art, and therefore the invention should be broadly construed in a manner consistent with its full spirit and scope.

What I claim is:

1. An electrical circuit component including a body having projecting terminal wires and an encasing tube, said encasing tube including an unfilled plastic-film tube having overlap seams joined by a moisture-impervious adhesive, and a rigidized and impregnated external covering of paper on said plastic tube, and a cured-resin end-fill covering each end of said body and bonded to the inner surface of said tube.

2. An electrical circuit component including a body having projecting terminal wires and an encasing tube, said encasing tube including an unfilled-plastic-film tube, a complete external metal-foil covering adhered to said plastic-film tube with a moisture-impervious adhesive, and a rigidized and impregnated external covering of paper on said foil-and-plastic tube, and a cured-resin end fill covering each end of said body and bonded to the inner surface of said tube.

3. An electrical circuit component including a body having oppositely projecting terminal wires and an encasing tube, said encasing tube including an unfilled-plastic-film tube, a complete external metal-foil covering adhered to said plastic-film tube with a moisture-impervious adhesive, and a rigidized and impregnated external covering of paper on said foil-and-plastic tube, and a cured-resin end fill covering each end of said body and bonded to the inner surface of said tube, the end-fill at only one end of said encasing tube being of an electrically conductive composition, and extending to the edges of the metal-foil layer in the encasing tube.

4. An electrical condenser including a condenser body having oppositely projecting terminal wires and an encasing tube, said encasing tube including an unfilled-plastic-film tube, a complete external metal-foil covering adhered to said plastic-film tube, and a rigidized and impregnated external covering of paper on said foil-and-plastic tube, and a cured-resin end-fill covering each end of said body and bonded to the inner surface of said tube.

5. An electrical condenser including a condenser body having oppositely projecting terminal wires and an encasing tube, said encasing tube including an unfilled-plastic-film tube having overlap seams adhered together by moisture-impervious cement, and a rigidized and impregnated external covering of paper on said plastic tube, and a cured-resin end-fill covering each end of said body and bonded to the inner surface of said tube.

6. An electrical condenser including a condenser body having oppositely projecting terminal wires and an encasing tube, said encasing tube including an unfilled-plastic-film tube having overlap seams adhered together by moisture-impervious cement, a complete external metal-foil covering adhered to said plastic-film tube with a moisture-impervious adhesive, and a rigidized and impregnated external covering of paper on said plastic tube, and a cured-resin end-fill covering each end of said body and bonded to the inner surface of said tube, the end-fill at only one end of said encasing tube being of an electrically conductive composition, and extending to the edges of the metal-foil layer in the encasing tube.

References Cited by the Examiner

UNITED STATES PATENTS

| | | | |
|---|---|---|---|
| 2,103,841 | 12/37 | Calvert | 156—53 |
| 2,106,850 | 2/38 | McCulloch | 156—53 |
| 2,203,232 | 6/40 | Osborne | 156—53 |
| 2,298,748 | 10/42 | Brown | 156—55 |
| 2,549,770 | 4/51 | Burnham | 317—260 |
| 2,597,338 | 5/52 | Kohring | 174—52 X |
| 2,622,133 | 12/52 | Dorst | 317—258 X |
| 2,707,204 | 4/55 | Richardson et al. | 156—55 X |
| 2,785,351 | 3/57 | Allison | 317—260 |
| 2,833,684 | 5/58 | Horowitz | 156—195 X |
| 2,881,243 | 4/59 | Ebel | 156—55 |
| 2,908,067 | 10/59 | Clemons | 29—25.42 |
| 2,974,396 | 3/61 | Allison | 317—260 |
| 3,020,453 | 2/62 | Hogue | 317—260 |
| 3,084,415 | 4/63 | Dokuchitz et al. | 29—25.42 |

JOHN F. BURNS, *Primary Examiner.*

BENNETT G. MILLER, JOHN P. WILDMAN, E. JAMES SAX, *Examiners.*